Patented Dec. 22, 1925.

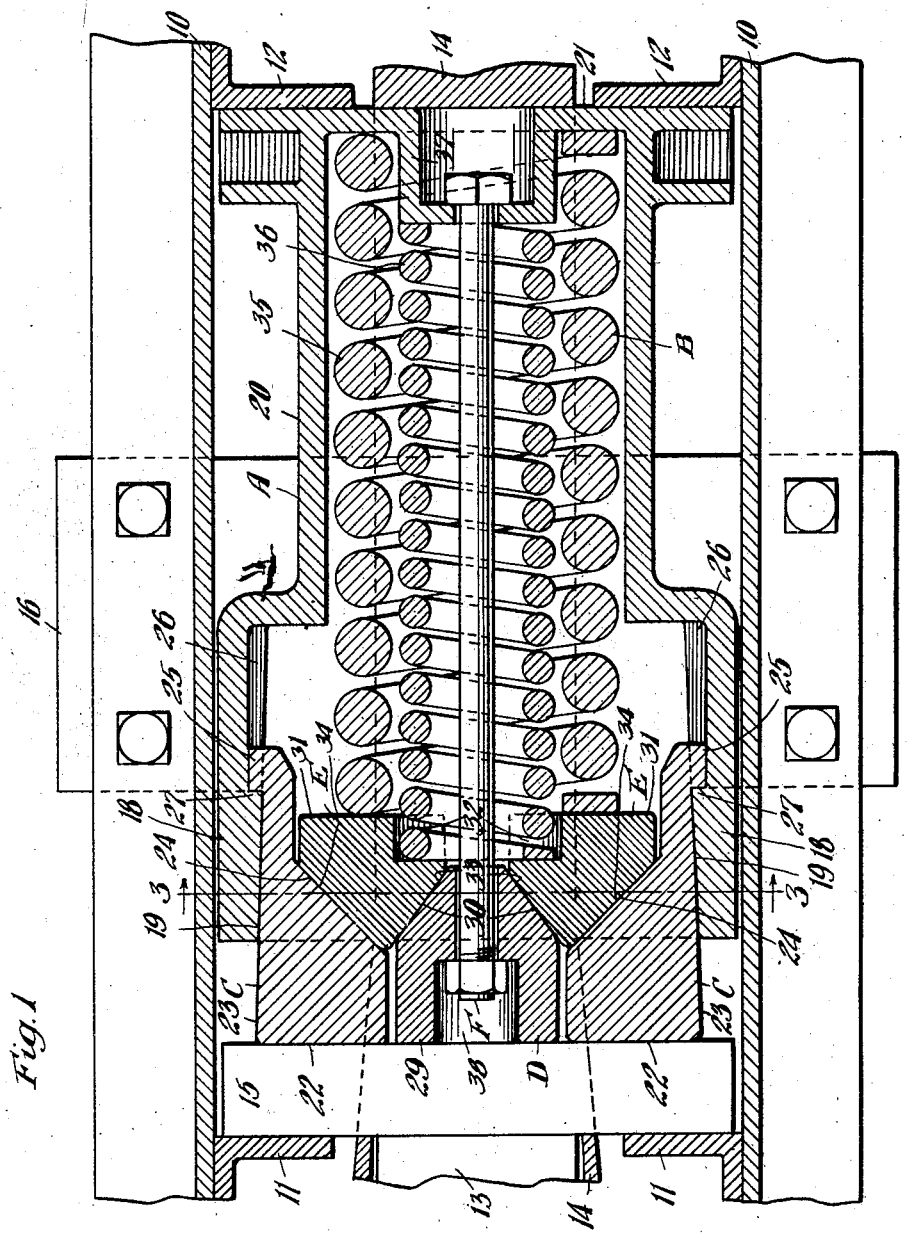

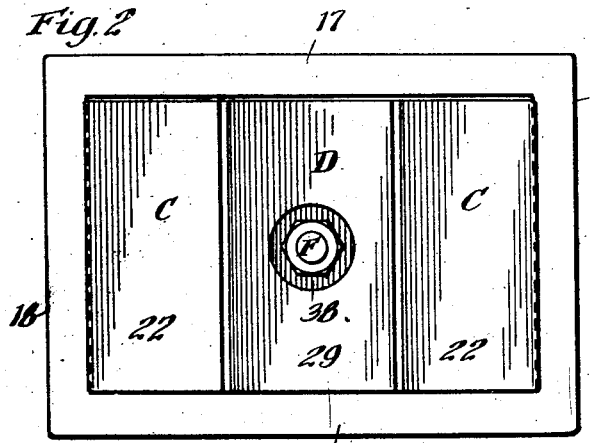
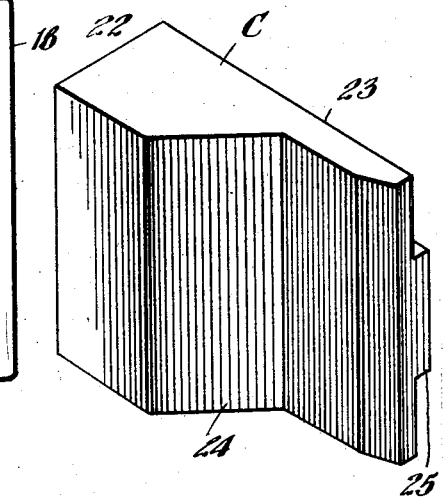
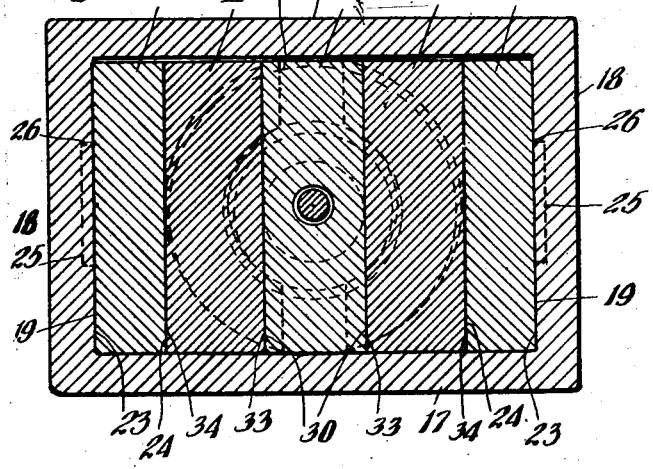
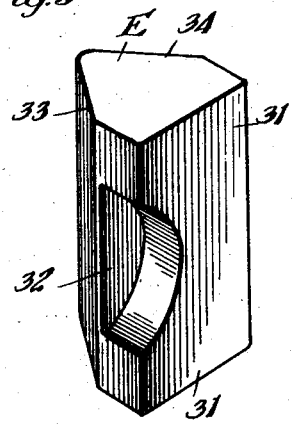

1,566,685

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed January 19, 1923. Serial No. 613,623.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism especially adapted for railway draft riggings wherein the friction elements are so designed as to produce a differential action during the compression stroke.

A more specific object of the invention is to provide a friction draft gear of the differential type comprising a follower, a central wedge co-acting with auxiliary wedges, and a set of friction shoes co-acting with the auxiliary wedges and with inwardly tapering friction surfaces of the friction shell and having friction surfaces co-acting with the follower.

Other objects of the invention will more clearly appear from the description hereinafter following.

In the drawings forming a part of this specification Fig. 1 is a horizontal longitudinal sectional view of a portion of a railway draft rigging showing my improvements in connection therewith. Fig. 2 is an outer end view of the shock absorbing mechanism shown in Fig. 1, with the front follower omitted. Fig. 3 is a vertical transverse sectional view of the shock absorbing mechanism, corresponding substantially to the section line 3—3 of Fig. 1. And Figs. 4 and 5 are detailed perspective views of an outer wedge friction shoe and an auxiliary wedge respectively, employed in connection with my improved draft gear.

In said drawings, 10—10 denote channel draft sills of a car under frame, to the inner faces of which are secured front stop lugs 11 and rear stop lugs 12. A portion of a draw-bar is indicated at 13, the same being operatively associated with a hooded cast yoke 14 within which is disposed the shock absorbing mechanism proper and a front follower 15. The yoke and the parts therewithin are supported in operative position by a detachable saddle plate 16.

The improved shock absorbing mechanism proper, as shown, comprises broadly: a combined friction shell and spring cage casting A; a spring resistance B; two outer wedge friction shoes C—C; a central wedge D; two auxiliary wedges E—E; and a retaining bolt F.

The casting A is provided at its front or outer end with a friction shell proper defined by top and bottom walls 17—17 and side walls 18—18, the latter being provided on their inner sides with friction surfaces 19—19, which converge slightly inwardly of the shell. Rearwardly of the shell proper, the casting A is reduced in size to provide a spring cage 20 or casing to accommodate and center the spring resistance B. At its rear end the casting A is formed with an integral vertical wall 21 extended laterally to engage with the stop lugs 12 and act as the rear follower of the mechanism.

The two outer wedge friction shoes C—C are of like construction, but oppositely arranged. Each shoe C is formed with a front, transversely extending, flat friction surface 22, a side friction surface 23 and an inner wedge friction surface 24, said surfaces 22, 23 and 24 frictionally co-operating with the front follower 15, a shell friction surface 19 and an auxiliary wedge E, respectively. Each friction shoe C is provided at the inner end thereof with a stop lug 25 located centrally of and projecting outwardly from the friction surface 23 thereof. Each lug 25 is slidingly accommodated in a slot 26 in the adjacent friction surface 19 of the shell and is limited in its outward movement by engagement with a shoulder 27 at the forward end of the slot 26. Means is thus provided for limiting the outward movement of the wedge friction shoes C—C with reference to the shell A.

The central wedge block D is formed on the front side thereof with a flat bearing surface 29 which engages with the inner face of the follower 15. On its inner side, the wedge block is formed with inwardly converging faces 30 symmetrically disposed with relation to the center line of the mechanism.

The two auxiliary wedges E—E are of like construction, but are oppositely arranged, each having a flat rear face 31 provided with a segmental recess 32. Each of the auxiliary wedges E is also provided with a pair of outwardly converging faces 33 and 34 disposed on opposite sides thereof and co-acting with one of the faces 30 of the wedge and the wedge face 24 of the adjacent wedge friction shoe C.

As clearly shown in Fig. 1, the wedge faces 33 which co-act with the wedge D extend at a relatively keener angle with reference to the longitudinal axis of the gear than the faces 34, which co-act with the shoes C, the wedge faces 33 and 34 being preferably inclined at angles of approximately 30° to 45° respectively with reference to said longitudinal axis of the gear.

The spring resistance B comprises a relatively heavy outer coiled spring 35 and a relatively light inner coiled spring 36. The outer spring is interposed between the rear wall 21 of the cage and the faces 31 of the auxiliary wedges E, and centered by the inwardly projecting hollow boss 37 on the rear wall 21 of said cage. The inner spring 36 has its rear end abutting the end of the boss 37 and its outer end seated in the segmental recesses 32 of the auxiliary wedges E.

The retainer bolt is anchored at its inner end in the hollow boss 37 and at its forward end within the recess 38 provided in the wedge block D, thereby limiting the outward movement of the latter relatively to the shell A.

The operation of the mechanism during a compression stroke, assuming a buffing movement of the draw-bar, is as follows. As the follower 15 is moved inwardly the two wedge friction shoes C and the wedge block D are forced inwardly at the same rate, thereby setting up a wedge action between the same and the spring resisted auxiliary wedges E. As the wedge shoes travel down the inclined shell friction surfaces, lateral movement will be imparted to the shoes, thus creating friction not only between the shoes and the shell, but also between the shoes and the outer follower 15. The lateral inward movement of the wedge friction shoes C also produces a differential wedge action, causing the auxiliary wedges, in addition to their inward movement with the shoes and the wedge block to travel inwardly relatively to said shoes and wedge block on the wedge faces 24 and 30, thereby effecting an additional compression of the spring resistance. During this inward movement the auxiliary wedges also gradually approach each other, due to their movement on the wedge faces 30 of the wedge block.

When the actuating pressure is removed, the parts are returned to normal position as clearly shown in Fig. 1, the wedge friction shoes C moving outwardly until the stops 25 engage with the stop shoulders 27, whereupon movement of the wedge shoes is arrested. The wedge block moves outwardly until its movement is arrested by engagement with the nut on the retainer bolt F, the auxiliary wedges being held in contact with the co-acting wedge faces of the wedge block D and the wedge friction shoes C.

By making the angle on the wedge faces between the shoes and the auxiliary wedges relatively blunt with reference to the longitudinal axis of the gear, quick release of the wedge system is effected upon removal of the compressive forces, and the outward movement of the wedge friction shoes and positive return of the parts assured.

From the preceding description taken in connection with the drawings, it will be evident that the wedge friction shoes and the wedge block will always be restored to normal position and that the spring resistance will always hold the auxiliary wedges in contact with the wedge friction shoes and the wedge block, whereby all wear of the friction and wedge faces is compensated for.

I have herein shown and described what I now consider a preferred manner of carrying out my invention, but the same is merely illustrative and I contemplate all changes and modifications that come within the scope of the claims appended hereto.

I claim:

1. In a friction shock absorbing mechanism, the combination with a friction shell having opposed interior friction surfaces converging slightly inwardly of the mechanism; of a spring resistance; an outer follower, said follower and shell being movable relatively to each other; wedge friction shoes engaged by said follower and movable longitudinally inwardly of the shell on the friction surfaces thereof; a wedge pressure transmitting member movable with said follower; and auxiliary wedges having wedging engagement with said pressure transmitting member and said wedge shoes.

2. In a friction shock absorbing mechanism, the combination with a friction shell having longitudinally extending opposed slightly inwardly converging friction surfaces; of an outer follower, said follower and shell being movable toward and from each other; wedge friction shoes having friction surfaces co-operating with said shell friction surfaces, said shoes each also having an inner wedge face, said shoes abutting said follower and having sliding movement laterally on the same; a central pressure transmitting member movable with said follower, said member having wedge faces on the opposite sides thereof; auxiliary wedges interposed between said pressure transmitting member and the wedge friction shoes, said auxiliary wedges each having inner and outer wedge faces co-operating respectively with one of the faces of said pressure transmitting member and the wedge face of one of said shoes; and a spring resistance co-acting with said auxiliary wedges.

3. In a friction shock absorbing mechanism, the combination with a shell having longitudinally disposed, interior opposed, slightly inwardly converging friction surfaces; of a spring resistance; an outer follower; friction shoes having longitudinally disposed friction surfaces co-operating with the shell friction surfaces, said shoes bearing directly on the outer follower; means on said shoes adapted to engage the shell for limiting the outward movement of said wedge friction shoes relatively to said shell; a wedge pressure transmitting means co-acting with said outer follower; and auxiliary wedges interposed between said wedge pressure transmitting means and said friction shoes, said shoes and auxiliary wedges having co-operating wedge faces.

4. In a friction shock absorbing mechanism, the combination with a friction shell having inwardly converging friction surfaces; of a spring resistance; an outer follower; friction shoes having friction surfaces co-operable with said shell and follower, each of said shoes also having a wedge face; a wedge pressure transmitting member engaging said follower; auxiliary wedges co-acting with said wedge pressure transmitting member and the wedge faces of said shoes; and means for limiting the outward movement of said wedge pressure transmitting member and additional means on said shell engageable with said shoes for limiting outward movement of the shoes with reference to the shell.

5. In a friction shock absorbing mechanism, the combination with a friction shell having inwardly converging friction surfaces; wedge friction shoes co-operable with said shell and follower; a wedge pressure transmitting member; auxiliary wedges having wedge faces on opposite sides co-acting with said wedge pressure transmitting member and said wedge shoes, the wedge faces of each said auxiliary wedges co-acting with said wedge shoes being at a blunt angle with reference to the longitudinal axis of the gear, and the faces of each said auxiliary wedges coacting with the wedge pressure transmitting means being at a relatively keener angle with reference to the longitudinal axis of the gear; and means for limiting the outward movement of said wedge pressure transmitting member and said wedge friction shoes relatively to the shell.

6. In a friction shock absorbing mechanism, the combination with a friction shell having interior friction surfaces converging slightly inwardly of the mechanism; of a spring resistance; an outer follower; wedge friction shoes co-operable with said follower, said shoes having friction surfaces co-operating with said shell friction surfaces and each shoe having an inner wedge face; a pressure transmitting member movable with said follower, said member having wedge faces; and auxiliary wedges each having a wedge face co-acting with the wedge face of one of said shoes and a wedge face co-acting with one of the faces of said pressure transmitting member, one of said wedge faces of each auxiliary wedge being disposed at a relatively blunt angle with reference to the longitudinal axis of the mechanism and the other wedge face thereof being disposed at a relatively keen angle to said axis.

In witness that I claim the foregoing I have hereunto subscribed my name this 17th day of January, 1923.

JOHN F. O'CONNOR.